May 30, 1939.    R. L. HASCHE    2,159,988
GAS AND LIQUID CONTACT APPARATUS
Filed Sept. 10, 1936    2 Sheets-Sheet 1

Rudolph Leonard Hasche
INVENTOR.

BY
ATTORNEYS

May 30, 1939.　　　R. L. HASCHE　　　2,159,988
GAS AND LIQUID CONTACT APPARATUS
Filed Sept. 10, 1936　　　2 Sheets-Sheet 2
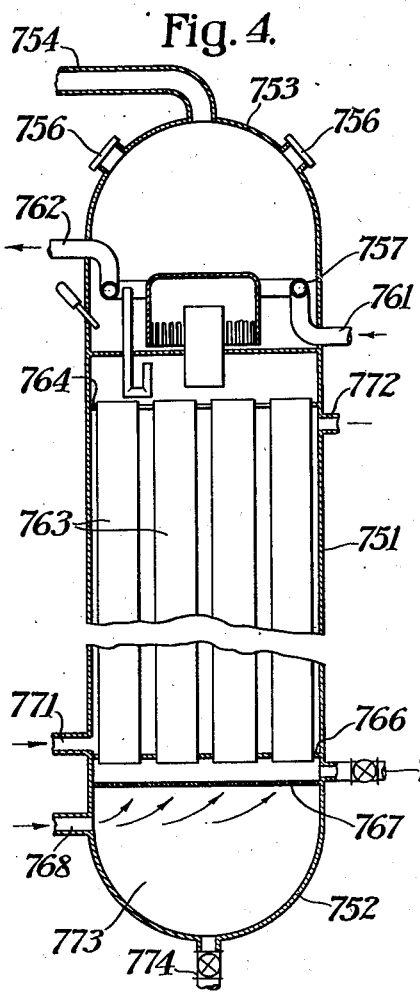
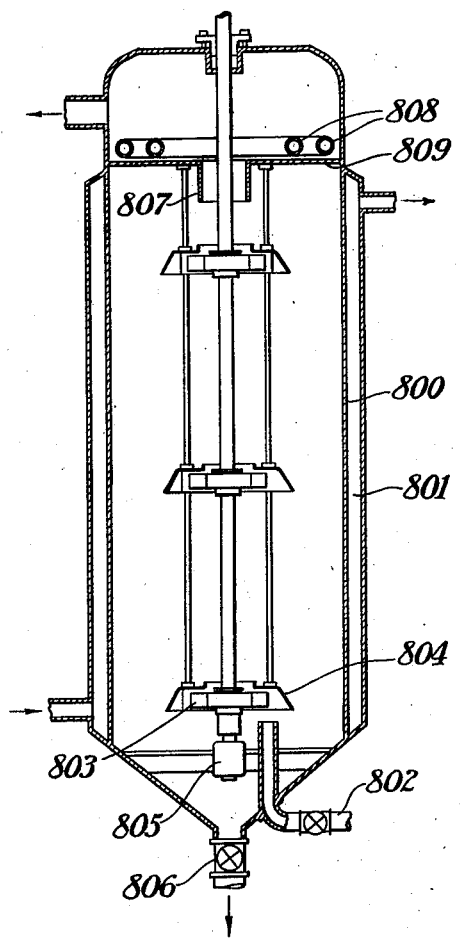
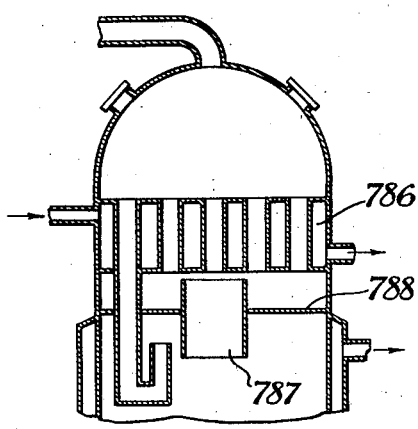
Rudolph Leonard Hasche
INVENTOR.
BY
ATTORNEYS Patented May 30, 1939

2,159,988

UNITED STATES PATENT OFFICE 2,159,988

GAS AND LIQUID CONTACT APPARATUS

Rudolph Leonard Hasche, Kingsport, Tenn., assignor to Eastman Kodak Company, Rochester, N. Y., a corporation of New Jersey Application September 10, 1936, Serial No. 100,144

13 Claims. (Cl. 261—9)

This invention relates to gas and liquid contact apparatus and more particularly to apparatus for contacting gases or vapors, or mixtures thereof, with a liquid containing a catalyst.

This application is a continuation-in-part of my application Serial No. 34,215, filed August 1, 1935.

There are many processes carried out industrially which require the use of apparatus for contacting gas or vapors with liquid. In such processes it is usually important that the gaseous component be brought into intimate contact with the liquid component under controlled conditions. Various chemical processes require the use of gas and liquid contact apparatus. For example, such apparatus is employed for contacting air or other oxidizing medium with a chemical which it is desired to convert to another compound.

An instance where gas and liquid contact apparatus may be employed is in the oxidation of an aldehyde with air or other oxidizing medium to the corresponding acid. The apparatus described herein is particularly adapted for carrying out catalytic oxidation treatment such as the oxidation of aldehydes. Consequently, I describe my apparatus as employed in oxidation processes but it is to be understood that the apparatus has wider applications in its use.

This invention has as one object to provide a gas and liquid contact apparatus in which gases or liquids may be brought into intimate contact with other gases or liquids. Another object is to provide a gas and liquid contact apparatus wherein the temperature within the various parts of the apparatus may be controlled. Still another object is to provide an apparatus in which gas and liquid contact may be caused to take place relatively independent of gas and liquid separation and a gaseous insulating layer may be maintained therebetween.

Still another object is to provide a gas and liquid contact apparatus comprising reaction and separation zones having a particular type partition construction therebetween.

Other objects will appear hereinafter.

These objects are accomplished by the following invention which includes apparatus wherein materials containing various gases and vapors may be intimately and thoroughly contacted with a liquid under conditions relatively separate and independent from the removal and recovery of the products formed by the aforementioned gas and liquid contact.

For further details concerning my new apparatus and for a more complete understanding of my invention, reference is made to the accompanying drawings forming a part of the present application.

Fig. 4 is a side elevation view partly in section, of another type gas and liquid contact unit embodying my invention.

Fig. 5 is another side elevation view illustrating an alternative arrangement which may be used in Figs. 1–4, inclusive.

Fig. 6 is a side elevation view partly in section of still another embodiment of my gas and liquid contact unit.

The construction of the various individual units will now be described in detail, particular reference being made to the construction and operation of these units for the oxidation of aliphatic aldehydes to aliphatic acids. However, as already indicated, this description of my apparatus employed for oxidizing aldehydes is merely for the purposes of illustration and is not to be construed as limiting my invention, as my invention has wider applications and may be employed in numerous other instances where it is desired to contact gases or vapors containing chemicals with a liquid.

Figure 1:
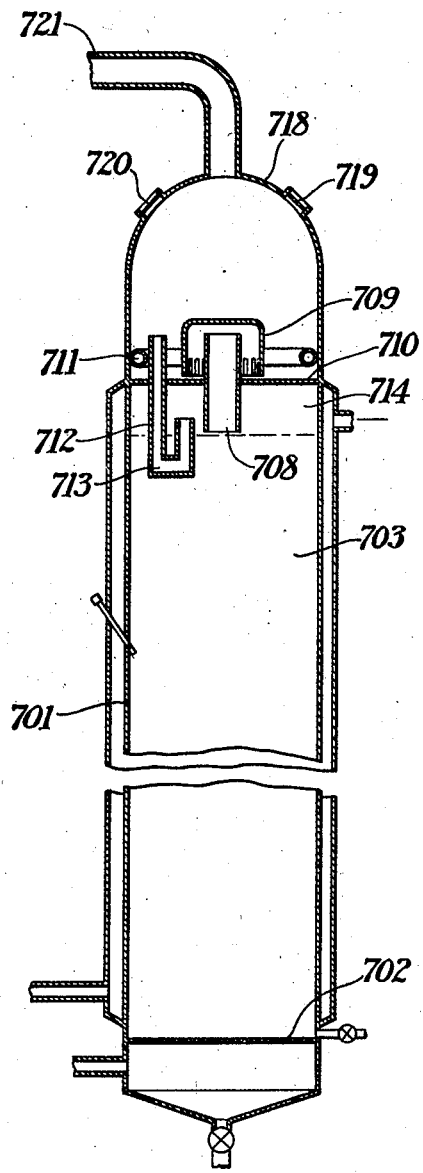
Fig. 1 is a conventional side elevation view in section of one embodiment of my novel gas and liquid contact apparatus and associated parts.

Reference is now made to Fig. 1 of the drawings. The unit there shown consists of the shell 701 about 12–36 inches in diameter. This shell may be made of $KA_2S$, $KA_2SMo$, chrome-nickel-copper steel or other material which is resistant to hot organic acids. This shell is generally cylindrical, but other construction is satisfactory. The shell is provided with a head 17 which may contain sight glasses 719, 720. Leading from the head is a vapor outlet conduit 721 which may be interconnected with suitable condensers or other equipment (not shown).

A perforated plate 702, which may also be of the aforementioned metals or noble metals such as silver, if alloyed to render them sufficiently hard and strong, is provided for supporting the liquid in my novel gas and liquid contact apparatus. For example, this liquid may comprise a catalyst solution containing cobalt or other eighth group metal.

Satisfactory plates are 15–30 gauge $KA_2S$ or

KA₂SMo sheets which contain about one to five thousand 1/64 to 3/64 inch holes, spaced checkerboard fashion on about 1/3 to 3/4 inch spacing. For ease in construction I prefer to employ about 1/32 inch holes on 1/2 inch spacing. The larger the holes the smaller number required for equivalent efficiency.

The inlets for the various constituents to be treated in my gas and liquid contact apparatus may be positioned below the perforated plate 702. The liquid supported upon this plate extends to the riser or chimney 708. The lower edge of this chimney extends into the liquid and restricts the passage of gas somewhat so that a layer of gas may be trapped at 714, particularly when solution is returning through down-comer pipe 713.

Figure 3:
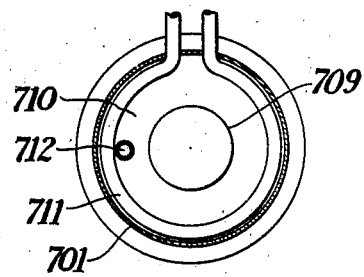
Fig. 3 is a top view of the plate construction shown in either of Figs. 1 or 2.

Any further increase in volume is carried up by the gas through the chimney and flows through bubble cap 709 into the top plate 710. It may be continuously vaporized from this compartment with heat supplied in steam coil 711. A top view of the plate is shown in Fig. 3. It is desirable that this coil be raised a short distance from the bottom of the plate so that the plate does not boil dry of acid and deposit out a cobalt salt solid, or other solid if another type catalyst is being employed.

A down-comer pipe 712 provided with a seal 713 allows the overflow of excess liquid into the lower compartment 703.

As more or less apart from the preceding description, the gas to be treated in my novel gas and liquid contact apparatus enters below perforated plate 702. By passing through the plate, the gas is dispersed into and through the liquid supported thereon. The reaction takes place in the liquid. By virtue of the increase in volume in the liquid, due to this reaction, as well as the pumping action of the gas flowing into the tower, a certain portion of the liquid is carried up through the chimney 708 into the head of unit 718. Any surplus above the predetermined level returns through conduit 713. While the liquid is in the head of the apparatus, it may be heated as by the coils 711, to drive off certain of the constituents. These vapors are then withdrawn through conduit 721 to recovery or other treatment as may be desired.

The function of the bubble cap is two-fold. First, it allows continuous vaporization of the oxidation product being produced, as organic acid at a lower temperature due to the passage of gas through the solution. By using the bubble cap, for example propionic acid (boiling point 141° C.) can be vaporized continuously as rapidly as formed at temperatures from about 100° C. to 115° C., depending on the amount of excess air or other diluent used. Second, the bubble cap serves to aerate the catalyst thereby maintaining a portion of the catalyst which returns to the lower compartment in an active state.

As indicated, one feature of my invention is the means employed for separating the main body of catalyst solution from the portion to be vaporized with an intervening layer of gas 714. This gas layer being a poor conductor of heat insulates the main body from the flash plate and acid separation zone above. The member that principally serves this purpose is the central chimney 708 which acts as an upflow passage and at the same time produces a pocket of insulating gas and vapor between the plate and the body of the catalyst.

My invention may be embodied in other type construction, as well as exemplified by reference to the other figures. It will be noted in these other constructions that there is likewise present a reaction zone and a separation zone with an interposed insulating zone.

Figure 2:
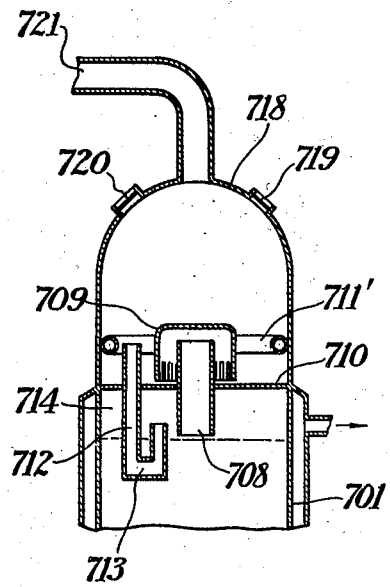
Fig. 2 is a side elevation view in section of an alternative arrangement of the structure shown in Fig. 1.

Fig. 2 shows an alternate arrangement in which the coil 711' is raised to approximately the downcomer level, thus simplifying the maintenance of a larger quantity of liquid in the plate compartment to insure circulation thereof. It is desirable that a certain amount of liquid flow through chimney 708 onto the plate 710, a portion of this solution being returned to the reaction chamber through the down-comer pipe 713. By this procedure the accumulation of solids such as cobalt catalysts or other material in the upper plate, due to evaporation, is prevented.

My gas and liquid contact units may be employed for treating various materials. For example, in the production of acetic acid the passage of air and aldehyde through an oxidation catalyst solution in the reaction chamber at optimum temperature, carries the acetic acid formed out through conduit 721 substantially at the rate it is produced. The apparatus may also be used for oxidizing propionaldehyde or butyraldehyde to corresponding acids.

While in Fig. 1 I have shown a unit externally jacketed for temperature control, on other installations the structure of Fig. 1 may be modified as shown in Fig. 4, for example. In Fig. 4 the tower comprises a shell 751 provided with a base 752 and a head 753. The head is equipped with an exit conduit 754 and sight glasses 756.

The upper part of the shell interior contains one or more temperature controlling tubes designated 757. These tubes are held in the shell and attached thereto by any suitable means. A heating or cooling medium may be supplied at 761 to circulate in and control the temperature of these tubes or passage-ways and their contents, this medium being withdrawn at 762.

This acid separation zone is separated from the reaction zone by means of a plate construction which substantially is the same as that shown with respect to Fig. 1, hence requires no further description here. Below this plate construction is a set of vertically extending tubes 763 supported with tube sheets or plates 764 and 766.

The oxidation catalyst solution is contained in these tubes by means of the perforated KA₂S stainless steel or noble metal retaining plate 767 positioned below tube sheet 766. This plate is the same as already described.

Gases, such as aldehyde and the oxidizing medium, with or without diluent material are admitted through conduit 768 under some pressure and pass up through the perforated plate followed by bubbling through the plurality of vertically extending columns of a liquid catalyst. Each column of catalyst acts as a small reaction chamber thereby minimizing explosion danger to some extent.

Furthermore, by this arrangement, the temperature of the catalyst solution can be closely controlled by introducing either cooling or heating mediums, as the case may be, at 771 and withdrawing the medium at 772.

In place of the single inlet pipe 768, individual conduits for each of the materials to be introduced may be employed. In order to cause the gases to distribute themselves through the catalyst solution, suitable baffles may be inserted in the base chamber 773, or the inlet pipe or pipes may be extended into the center of the base chamber and capped with some suitable device for distributing the gas.

Attached to the base 752 is a valved conduit 774 whereby any catalyst solution or other materials can be removed. Valved conduit 78 is provided for the introduction and withdrawal of catalyst solution.

Fig. 5 shows a modified type of unit in which the bubble cap is eliminated and a short calandria 786 is placed just above the chimney 787 which extends through plate 788. Otherwise the structure is quite similar to the figures already disclosed, and require no further description. This type of arrangement is particularly suitable for cooling the liquid in the upper compartment and would be suitable for acetic and formic acid production.

It may be used for the production of propionic and butyric acids by running steam in the calandria section.

In Fig. 6 the unit consists of a shell 800 provided with an outer cooling jacket 801. The gases, aldehyde vapors and air, enter through pipe 802 and are introduced into the vortex of impeller 803 of a lower mixer unit which may be of the Turbo type. The gas is thrown outwards into the stator 804 thereby subdividing and dispersing the gas to a high degree in the solution. A steady-bearing 805 is shown although it is possible to dispense with this by providing suitable bearings outside of the apparatus and allowing the units to overhang into the catalyst solution. Valve 806 is provided for charging and withdrawing solution. The gas, after introduction into the bottommost unit, is finely dispersed and thrown outwards and downwards into the catalyst solution. A portion of the gas is then drawn up by the vortex through the impeller and again thrown outwards and downwards. Another portion of the gas passes up and is circulated by the middle unit, and the same process is repeated in the top impeller.

The gas carrying a certain amount of liquid passes up through a central chimney 807 surrounding the central shaft. Vaporization is accomplished by temperature controlling coils 808 as in figures just referred to. An insulating layer of gas is maintained between the bottom of chimney 807 and plate 809 which will allow the reaction to be carried on with one temperature and flashing in the top plate to be carried out at another temperature.

One advantage of the type of apparatus shown in the Fig. 6 over those shown in Figures 1 and 4, is that an apparatus of a much larger diameter can be used than with a perforated plate as the dispersing means. Very high turbulence of the liquid as well as the gas occurs with the mixer and hence a high rate of heat transfer between the shell of the unit and the cooling jacket can be maintained. In place of or in addition to an external cooling jacket there may be provided cooling coils located within the unit. The gas mixture and vapors of the reaction product pass out of the upper part of the apparatus and thence to condensing and recovery equipment (not shown).

It will be also understood that the customary precautions for preventing heat losses by suitable insulation will be observed, that parts which contact with the acids or corrosive materials are made out of suitable materials such as aluminum, aluminum alloys, copper or copper alloys, iron silicon alloys and various type of stainless steel. The steel known as KA₂S, I have found is particularly suitable for the construction of all parts which contact corrosive material. This steel contains 16 to 23% chromium, about 7 to 11% nickel and the balance substantially iron and is characterized by the important feature of having a low carbon content of .07% or less. This steel may have a small amount, about 1–5% Cu, Mo, W or Si. When containing Mo, it may be designated KA₂SMo.

Parts subject to heat will be constructed of heat resisting materials. The apparatus are preferably adapted to operate above atmospheric pressure or slightly higher pressure. As indicated, my apparatus may be employed for contacting various gases or mixtures of gases such as air, an aldehyde, or other organic compound, with various catalyst solutions such as cobalt containing catalyst solutions.

It is therefore apparent that my invention is susceptible of modification. Hence, I do not wish to be restricted excepting insofar as is necessitated by the prior art and the spirit of the appended claims.

What I claim as my invention and desire to secure by Letters Patent of the United States is:

1. A gas and liquid contact apparatus, which comprises a shell having top and bottom closures attached thereto to form an enclosed chamber, a plate construction within the apparatus dividing the chamber into a lower and a smaller upper zone, the plate construction including a gas riser which extends into the lower zone and an overflow conduit which terminates in a U-trap whereby a gaseous insulating layer may be formed between the two zones, temperature control elements associated with the apparatus, and inlet and outlet conduits connected to the apparatus.

2. An oxidation unit for the oxidation of aldehyde to acid comprising a shell having top and bottom closures attached thereto to form an enclosed chamber, a plate construction within the unit dividing the chamber into a reaction zone and acid separation zone, the plate construction including a chimney which extends into the reaction zone and is provided with a bubble cap positioned in the separating zone and a downcomer pipe which terminates in a trap whereby an insulating layer of gas may be formed between the reaction zone and acid separation zone, temperature controlling means associated with the reaction zone and acid separation zone, and inlet and outlet conduits connected to the unit.

3. In a catalysis unit for the oxidation of chemical materials, a vertically extending tower, partition construction across the tower dividing the tower into a reaction zone and separation zone, the partition construction including a conduit provided with a gas flow cap, said conduit extending into the reaction zone, and a down flow conduit whereby an insulating layer of material may be formed between the reaction zone and the separation zone, vertically extending partitions within reaction zone, a floor having between about 1/50th inch to 1/75th inch perforations positioned below the reaction zone, means to deliver gaseous materials under the floor, means to deliver materials above the floor and temperature controlling means associated with both the reaction zone and acid separation zone.

4. In a gas and liquid contact unit, a vertically extending column, partition construction extending across the column dividing the column into a plurality of zones, one of the partition constructions including a chimney which extends into the reaction zone and a down flow conduit whereby an insulating layer of material may be formed, another partition comprising a plate including perforations sufficiently small to offer resistance to the flow of liquids but permitting the flow of gas, tubular temperature controlling means associated with certain of the zones, and inlet and outlet conduits leading to some of the zones.

5. A gas and liquid contact apparatus which comprises an enclosed chamber containing a mechanical agitator for dispersing gas in liquid contained in the chamber, a plate in the upper portion of the chamber, provided with at least one gas riser which extends a substantial distance below the lower side of said plate whereby an insulating layer of gas may be formed, temperature controlling means associated with the chamber and conduits connected with the chamber for supplying gaseous materials thereto and the removal of products therefrom.

6. A gas and liquid contact apparatus which comprises a shell having top and bottom closures attached thereto to form an enclosed chamber, partition construction dividing the chamber into a lower reaction zone and an upper separation zone materially smaller than the reaction zone, said zones being adapted to operate at substantially different temperatures, the partition construction including a chimney means that substantially extends into the reaction zone, and provides the only gas transfer passage, so that a gaseous insulating layer may be formed between the two zones, said reaction zone being constructed so as to be adapted to contain a body of liquid which extends at least to the lower edge of said chimney, temperature controlling conduits positioned within the upper zone near the partition construction, and inlet and outlet conduits connected with the apparatus.

7. A gas and liquid contact apparatus which comprises a shell having top and bottom closures attached thereto to form an enclosed chamber, a partition construction dividing the chamber into a reaction zone and a separation zone, said zones operating at different temperatures, the partition construction including a chimney construction that extends into the reaction zone, said reaction zone being constructed so as to be adapted to contain a body of liquid which extends at least to the lower edge of said chimney, a temperature controlling conduit positioned within the separation zone, means for dispersing feed materials associated with the reaction zone, a temperature controlling jacket enclosing at least a part of the reaction zone, and conduits connected with the apparatus for supplying materials thereto and the removal of products therefrom.

8. A gas and liquid contact apparatus which comprises an enclosed chamber, a partition construction dividing the chamber into at least a lower reaction zone and a separation zone, the reaction zone being adapted to contain a liquid through which a gas is to be bubbled, a chimney connecting the zones and extending into the reaction zone, a mechanical agitator positioned within the reaction zone for dispersing feed, a feed conduit for gases and vapors leading into the reaction zone and into close proximity with the agitator, and an outlet conduit leading from the apparatus.

9. A gas and liquid contact apparatus for the oxidation of aldehyde to acid, which comprises a shell having a top and bottom attached thereto, a partition construction within the apparatus dividing the apparatus into a reaction zone for oxidizing aldehyde to acid in the presence of a catalyst solution, and a separation zone substantially smaller than said reaction zone, for separating acid from catalyst solution, said zones being adapted to operate at substantially different temperatures, the partition construction including a chimney that extends into the reaction chamber, means for dispersing aldehyde associated with the reaction zone, said reaction zone being constructed so as to be adapted to contain a body of liquid which extends at least to the lower edge of said chimney, temperature controlling conduits positioned in the separation zone and a temperature controlling jacket enclosing at least a part of the reaction zone.

10. A gas and liquid contact apparatus which comprises an enclosed chamber, partition constructions dividing the chamber into a plurality of zones, one of the partition constructions including a chimney that extends a substantial distance therebelow, another partition construction provided with a plurality of perforations sufficiently small to offer resistance to the flow of liquid but permitting the flow of gas, temperature controlling means positioned adjacent the first mentioned partition construction, inlet and outlet conduits connected with the apparatus, and at least one of said conduits feeding into close proximity with said perforations.

11. Apparatus for contacting chemical material with an oxidizing medium in the presence of a catalyst liquid, which comprises an enclosed chamber, a plate construction in the chamber for dividing the chamber into a lower reaction zone and a separation zone, chimney means attached to the plate and extending into the reaction zone, the reaction zone being adapted to contain a liquid through which a gas is to be bubbled a sufficient distance to trap a layer of gas below the plate, temperature controlling conduits positioned within the separation zone, an impeller positioned within reaction zone and conduit means leading from without the chamber into the chamber and feeding directly into said impeller.

12. A gas and liquid contact apparatus which comprises an enclosed chamber containing rotating means for causing dispersion of gas in a liquid contained in the chamber, a plate in the upper portion of the chamber provided with at least one gas riser which extends a substantial distance below the lower side, whereby an insulating layer of gas may be formed, temperature controlling means associated with the chamber and conduits connected with the chamber for supplying gaseous materials thereto and the removal of products therefrom.

13. A gas and liquid contact apparatus, which comprises an enclosed chamber containing in the lower portion a perforated plate for dispersing a gaseous medium introduced into the chamber, another plate in the upper portion of the chamber provided with at least one gas riser which extends into the chamber toward said perforated plate, said chamber being adapted to contain a body of liquid which extends at least to the lower edge of the gas riser, temperature controlling means associated with the chamber and conduits connected with the chamber for supplying gaseous materials thereto and the removal of products therefrom.

RUDOLPH LEONARD HASCHE.

CERTIFICATE OF CORRECTION.

Patent No. 2,159,988. May 30, 1939.

RUDOLPH LEONARD HASCHE.

It is hereby certified that error appears in the printed specification of the above numbered patent requiring correction as follows: Page 3, first column, line 6, for "conduit 78" read conduit 778; page 4, second column, lines 40 and 41, claim 11, strike out the comma and words ", the reaction zone being adapted to contain a liquid through which a gas is to be bubbled" and insert the same after "zone" and before the comma in line 38, same claim; and that the said Letters Patent should be read with this correction therein that the same may conform to the record of the case in the Patent Office.

Signed and sealed this 12th day of September, A. D. 1939.

(Seal)

Henry Van Arsdale,
Acting Commissioner of Patents.